UNITED STATES PATENT OFFICE.

ALFRED EINHORN, OF MUNICH, GERMANY, ASSIGNOR TO THE FARBWERKE, VORMALS MEISTER, LUCIUS & BRÜNING, OF HÖCHST-ON-THE-MAIN, GERMANY.

ESTERS OF PARA-OXY-META-AMIDOBENZOIC ACID AND PROCESS OF MAKING SAME.

SPECIFICATION forming part of Letters Patent No. 625,158, dated May 16, 1899.

Application filed December 1, 1897. Serial No. 660,409. (Specimens.)

*To all whom it may concern:*

Be it known that I, ALFRED EINHORN, professor of chemistry and doctor of natural science, a citizen of the Empire of Germany, residing at Munich, Germany, have invented certain new and useful Improvements in the Manufacture of Esters of Para-Oxy-Meta-Amidobenzoic Acid, of which the following is a specification.

This invention relates to the production of esters of para-oxy-meta-amidobenzoic acid.

I have found that the alkylesters of para-oxy-meta-amidobenzoic acid may be obtained by the action of mineral acids upon the alcoholic solutions of the above acid, the reaction taking place according to the following equation:

$$C_6H_3(3)\overset{(4)OH}{\underset{(1)COOH}{NH_2}} + HO-alkyl = C_6H_3(3)\overset{(4)OH}{\underset{(1)COO\ alkyl}{NH_2}} + HO$$

which means the same as:

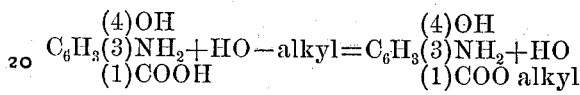

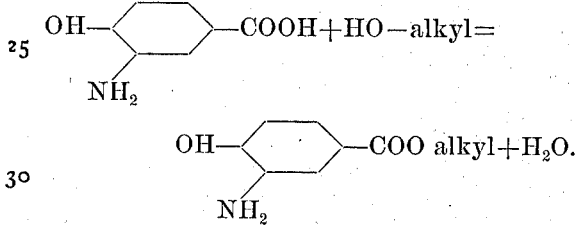

The new compounds have proved to be valuable medicaments.

I was the first who obtained alkylesters of para-oxy-meta-amidobenzoic acid. Barth, (*Feitschrift für Chemie* 1886, 648,) however, has tried to obtain the alkylesters para-oxy-meta-amidobenzoic acid by reducing a nitro compound. Yet he says himself with regard to this: "The manufacture of the free amido-para-oxybenzoate of ethyl was frustrated by its great instability."

In manufacturing the new compound I proceed, for instance, as follows: On one part, by weight, of the hydrochlorid of para-oxy-meta-amidobenzoic acid, obtained by reducing para-oxy-meta-nitrobenzoic acid with tin and hydrochloric acid, are poured five parts, by weight, of ethyl or methyl alcohol, then saturated with hydrochloric acid, and finally heated on the water-bath. On cooling, the hydrochlorid of the oxy-amido-ester separates out from the solution. It is then filtered and the free ester obtained by treating the hydrochlorid with sodium carbonate. The ester crystallizes in white needles and melts above 100° centigrade. It is easily soluble in hot water, ether, and alcohol; less soluble in benzene and ligroin. The hydrochlorid of the ester is soluble in water; soluble with difficulty in hydrochloric acid. The salicylate is readily soluble in warm water and alcohol.

The para-oxy-meta-amidobenzoic acid alkylester acts as a local anesthetic like cocain and is used in form of ointment or powder for the dressing of wounds.

Having now described my invention, what I claim is—

1. Process for the manufacture of para-oxy-meta-amidobenzoic acid ester consisting in the action of mineral acids upon the alcoholic solutions of para-oxy-meta-amidobenzoic acid, substantially as described.

2. As a new product, the para-oxy-meta-amidobenzoic acid ester, the same being a white crystalline compound melting above 100° centigrade, easily soluble in hot water, alcohol and ether, soluble with difficulty in benzene or ligroin, and which on being heated with alkalies is transformed into the para-oxy-meta-amidobenzoic acid, substantially as set forth.

In testimony that I claim the foregoing as my invention I have signed my name in presence of two subscribing witnesses.

ALFRED EINHORN.

Witnesses:
EMIL HENZEL,
SAM. BARTLETT.